J. G. Jewell,
Sash Holder.
Nº 79,835. Patented July 14, 1868.
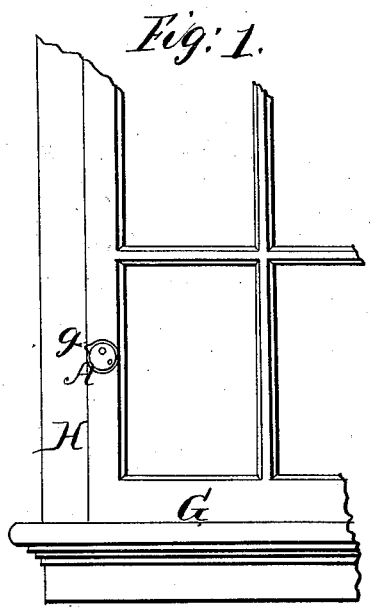
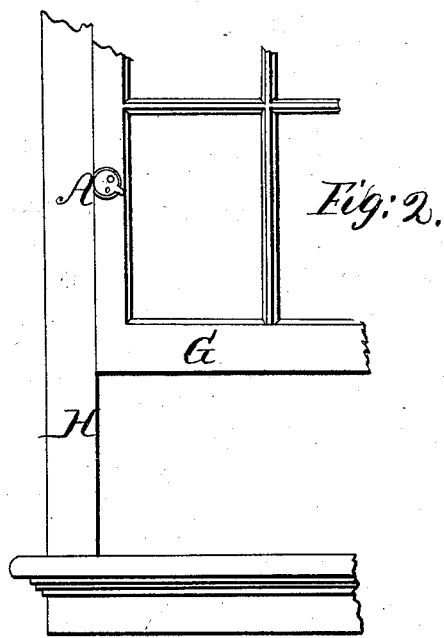
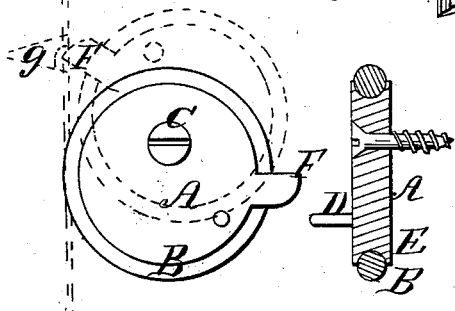
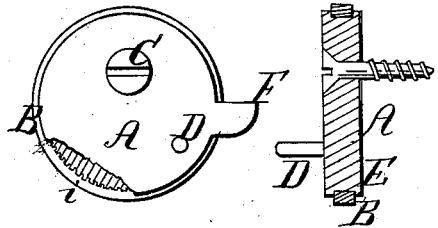
Witnesses:
Chas. R. Shaw
John Wrudby
Inventor:
J. Grey Jewell

United States Patent Office.

J. GREY JEWELL, OF WASHINGTON, DISTRICT OF COLUMBIA.

IMPROVEMENT IN WINDOW-SASH STOPS.

Specification forming part of Letters Patent No. 79,835, dated July 14, 1868.

*To all whom it may concern:*

Be it known that I, JAMES GREY JEWELL, of the city and county of Washington, and District of Columbia, have invented a new and Improved Mode of Fastening Window-Sash; and I do hereby declare that the following is a full and exact description thereof, reference being had to the accompanying drawings, and to the letters of reference marked thereon.

A is a metallic wheel or disk. B is a rubber ring, tire, or band. C is a screw penetrating A a little off the center; D, the pin or handle for revolving the wheel; E, a groove, corrugated, in which fits the rubber ring; F, a projecting tooth from the wheel A; $g$, a metallic socket-nail, in which F rests; $i$, the corrugations to prevent the rubber from slipping; H, the window-frame; G, the window-sash.

The nature of my invention consists in providing an eccentric disk or wheel with a corrugated groove in the edge of the same, to be made of metal, rubber, wood, porcelain, or other composition, with a projecting tooth on the edge, with a rubber ring or band in the groove, this disk or wheel to be attached to the sash or bead of the window-frame by a screw, so that when the window is raised and the rubber brought in contact with the bead or sash it will stop it at any elevation, and that without injury to the wood-work; and when the window is down, and it is desired to keep it thus, the disk or wheel may be reversed in position, and by placing the projecting tooth in the metallic socket provided for it the window cannot be raised.

When using the rubber ring as here described in warm climates or attached to heavy windows, the contractile power of the rubber becomes lessened and its tendency is to slip in the groove. By corrugating the groove it is impossible for the rubber to slip by the application of any reasonable weight or relaxation from heat.

I do not claim the eccentric wheel or handle for revolving the same, as these have been used in various forms.

What I claim, and desire to secure by Letters Patent, is—

1. The combination of the metallic socket-nail $g$ with the tooth F, the socket-nail to be made with a sharp point where it penetrates the wood, so that it may be driven into its proper place, like a nail or tack, having an angular groove in its head, in which the tooth F rests when the window is locked down.

2. The corrugated groove $i$ in the disk or wheel A, in combination with the rubber ring or band B, so as to prevent the rubber from slipping when in use.

Dec. 27, 1867.

J. GREY JEWELL.

Witnesses:
JOHN BRADLY,
CHAS. B. SHAW.